United States Patent
Munekata et al.

(10) Patent No.: US 6,393,287 B1
(45) Date of Patent: May 21, 2002

(54) SYSTEM FOR SWITCHING SPEECH CHANNEL BETWEEN LOOSELY COUPLE RADIO BASE STATIONS

(75) Inventors: Hiroyuki Munekata; Hirofumi Shiotsuki, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/576,428

(22) Filed: May 22, 2000

(30) Foreign Application Priority Data

May 24, 1999 (JP) .......................................... 11-143176

(51) Int. Cl.[7] ................................................ H04Q 7/20
(52) U.S. Cl. ...................................... 455/442; 455/525
(58) Field of Search ................................ 455/436, 437, 455/438, 439, 440, 441, 442, 443, 444, 450, 451, 452, 455, 509, 516, 524, 525, 527; 370/331, 332

(56) References Cited

U.S. PATENT DOCUMENTS

| | | | | |
|---|---|---|---|---|
| 5,509,051 A | * | 4/1996 | Barnett et al. | 455/436 |
| 5,613,205 A | * | 3/1997 | Dufour | 455/436 |
| 6,192,244 B1 | * | 2/2001 | Abbadessa | 455/436 |
| 6,216,002 B1 | * | 4/2001 | Holmring | 455/436 |

* cited by examiner

Primary Examiner—Nguyen T. Vo
Assistant Examiner—Duc Nguyen
(74) Attorney, Agent, or Firm—Whitham, Curtis & Christofferson, P.C.

(57) ABSTRACT

Disclosed is a speech channel switching system which has: a radio base station control unit that allows a mobile telephone terminal to have a communication channel through a plurality of radio base station devices; and a radio base station which is provided with a field strength measurement-only channel which allows the mobile telephone terminal to measure the field strength of radiowave received. In the system, the mobile telephone terminal measures the field strength in field strength measurement-only channel designated and informing the radio base station control unit of the measurement results through the radio base station. The radio base station control unit is provided with a hand off table for recording a soft hand off candidate station for each radio base station, and an additional station search table for recording an additional radio base station that the candidate station is expected to next perform soft hand off, and, regardless of the field strength, allows the mobile telephone terminal to have a speech channel to the additional station.

4 Claims, 4 Drawing Sheets

3a, 4a, 5a, 6a, 7a, 8a, 9a : RADIO BASE STATION
3ap, 4ap, 5ap, 6ap, 7ap, 8ap, 9ap : PILOT CHANNEL
7 : MOBILE TELEPHONE TERMINAL
8 : RADIO BASE STATION CONTROL UNIT
9 : ASSEMBLED LINE
30a, 40a, 50a, 60a, 70a, 80a, 90a : SERVICE AREA

FIG.2

CONVENTIONAL SOFT HAND OFF CONTROL MEMORY

| RADIO BASE STATION | HAND OFF CANDIDATE RADIO BASE STATION |
|---|---|
| 3a | 4a, 5a, 6a, 7a, 8a, 9a |
| 4a | 3a, 5a, 9a |
| 5a | 3a, 4a, 6a |
| 6a | 3a, 5a, 7a |
| 7a | 3a, 6a, 8a |
| 8a | 3a, 7a, 9a |
| 9a | 3a, 4a, 8a |

HAND OFF TABLE

SYSTEM FOR SWITCHING SPEECH CHANNEL BETWEEN LOOSELY COUPLE RADIO BASE STATIONS

FIELD OF THE INVENTION

This invention relates to a system for switching a speech channel between loosely coupled radio base stations, and more particularly to a system for switching a speech channel that, even when a soft hand off instruction signal from a radio base station, which currently supplies speech communication service, does not reach the mobile telephone terminal, enables soft hand off control without causing the cut off of signal transmitted between the mobile telephone terminal and the radio base station.

BACKGROUND OF THE INVENTION

Soft hand off conforming to IS (Interim Standard)-95 specifications of TIA (TELECOMMUNICATIONS INDUSTRY ASSOCIATION)/EIA (ELECTRONIC INDUSTRY ASSOCIATION) is known in the art.

FIG. 1 is an illustration showing a conventional mobile telephone communication system to which soft hand off conforming to TIA/EIA IS-95 specifications is applied. The mobile telephone communication system conforming to TIA/EIA IS-95 specifications is a mobile telephone communication system of CDMA (code division multiple access) system which has a plurality of service areas 30a to 90a and a radio base station control unit 8. Radio base stations 3a, 4a, 5a, 6a, 7a, 8a, and 9a are provided on the service areas 30a, 40a, 50a, 60a, 70a, 80a, 90a, respectively. In fact, a plurality of radio base station control units 8 are installed and are connected to a plurality of radio base stations 3a and 9a to provide a wider range of service areas.

Different pilot channels are allocated to respective neighbor radio base stations. Specifically, pilot channels 3ap, 4ap, 5ap, 6ap, 7ap, 8ap, and 9ap are allocated respectively to radio base stations 3a, 4a, 5a, 6a, 7a, 8a, and 9a to perform transmission, and a mobile telephone terminal 7 exists which moves between the service areas.

FIG. 2 shows an example of conventional hand off table. The radio base station control unit 8 previously catalogs in the hand off table, as candidate stations for soft hand off, neighbor radio base stations, to which hand off is possible, among radio base stations to be controlled by the radio base station control unit 8.

The radio base station control unit 8 has a threshold for the addition of a speech channel and a threshold for the deletion of a speech channel used at the time of the switching of the speech channel. In practicing the soft hand off, the radio base station control unit 8 sends, as a hand off instruction signal, the threshold for the addition of a speech channel and the threshold for the deletion of a speech channel through a plurality of radio base stations to the mobile telephone terminal 7. The mobile telephone terminal 7 measures the receive field strength of each of a group of pilot channels designated by the radio base station control unit 8. When the measurement results are such that there is a pilot channel having a field strength above the threshold for the addition of a speech channel or a pilot channel having a field strength below the threshold for the deletion of a speech channel, the mobile telephone terminal 7 informs the radio base station control unit 8 of the field strength level of the pilot channel, requesting the switching of the speech channel.

Each radio base station sends information on pilot channel, system information, and field strength measurement list necessary for specifying a radio base station used at the time of initiation of call processing over paging channel (P-ch) to the mobile telephone terminal which exists in the service area of the radio base station. The mobile telephone terminal 7 present within the service area 80a recognizes from a signal on P-ch that the radio base station used at the time of the initiation of call processing is a radio base station 8a and that the field strength should be measured for pilot channels 3ap, 7ap, 8ap, and 9ap.

As soon as the request for call connection from the mobile telephone terminal 7 is sent to the radio base station control unit 8 through the radio base station 8a, the radio base station control unit 8, upon the completion of the establishment of the speech channel in the radio base station 8a, sends a neighbor list signal to the mobile telephone terminal 7. The mobile telephone terminal 7 again obtains the field strength measurement list, and measures the receive field strength of each of a group of pilot channels designated by the radio base station control unit 8. When the mobile telephone terminal 7 is moved from the radio base station 8a towards the radio base station 3a, due to the approach of the mobile telephone terminal 7 to the radio base station 3a, the pilot receive field strength of the pilot channel 3ap received by the mobile telephone terminal 7 exceeds the threshold for the addition of a speech channel. The mobile telephone terminal 7 sends a pilot field strength level report to the radio base station 8a. The radio base station 8a sends, to the radio base station control unit 8, the pilot field strength level report received through an assembled line 9 containing control signal lines and voice signal lines. The radio base station control unit 8 specifies from the received pilot field strength level report and the hand off table that, for the radio base station 8a, candidate radio base stations for hand off are 3a, 7a, and 9a and that, among the specified candidate radio base stations for hand off, the pilot channel having a pilot receive field strength above the threshold for the addition of a speech channel is the pilot channel 3ap. The radio base station control unit 8 adds the speech channel of the radio base station 3a, and advises the mobile telephone terminal 7 through a hand off instruction signal that the speech channel of the radio base station 3a and the speech channel of the radio base station 8a would be used in soft hand off after that. After the advice, the radio base station control unit 8 also sends a neighbor list signal. Thus, the mobile telephone terminal 7 obtains a field strength measurement list after the switching of the speech channel.

The mobile telephone terminal 7 measures the receive field strength of each of a group of pilots designated by the radio base station control unit 8. As the mobile telephone terminal 7 is further moved towards the radio base station 3a, the pilot receive field strength of the pilot channel 8ap becomes a value below the threshold for the deletion of the speech channel. In this case, the mobile telephone terminal 7 sends a pilot field strength level report to the radio base station 3a, and the radio base station 3a sends the pilot field strength level report through the assembled line 9 to the radio base station control unit 8. The radio base station control unit 8 judges that, from the hand off table, for the radio base station 3a, the radio base stations 4a, 5a, 6a, 7a, 8a, and 9a are candidate base stations for hand off, that the addition of a speech channel is not carried out because the pilot receive field strength of the specified candidate radio base stations for hand off does not exceed the threshold for the addition of the speech channel, and that, from the received pilot field strength level report, the speech channel of the radio base station 8a having a field strength below the threshold for the deletion of the speech channel should be deleted. The radio base station control unit 8 advises the mobile telephone terminal 7 through a hand off instruction signal that only the speech channel of the radio base station 3a is usable by the mobile telephone terminal 7. Thereafter, the radio base station control unit 8 deletes the speech channel of the radio base station 8a, and then sends a neighbor list signal to the mobile telephone terminal 7. Thus, the mobile telephone terminal 7 obtains a field strength measurement list to be applied after the switching of the speech channel.

The radio base station control unit 8 executes soft hand off control through the addition and deletion of speech channels in the manner described above.

In the CDMA type mobile telephone communication system, when there is a tunnel, a radio base station, of which the service area is an area within the tunnel, is installed. In this case, however, the receive field strength of the pilot channel is abruptly varied at the entrance and exist of the tunnel.

The mobile telephone terminal measures the pilot receive field strength of a pilot channel sent from a radio base station which currently supplies speech communication service. When the pilot receive field strength has become a value below the threshold for the deletion of a speech channel, the mobile telephone terminal starts up a hand off drop timer in order to judge whether or not a pilot field strength level report should be sent through the radio base station, which currently supplies speech communication service, to the radio base station control unit. Until the hand off drop timer times out, the field strength is continuously measured to examine whether or not the pilot receive field strength of the pilot channel, which has been once lowered to a value below the threshold for the deletion of a speech channel again exceeds the threshold for the deletion of a speech channel. Upon the time-out of the hand off drop timer, the mobile telephone terminal sends the pilot field strength level report to the radio base station control unit, and is then transferred to the status of a wait for an instruction of soft hand off from the radio base station control unit.

However, an abrupt variation in the pilot receive field strength of the pilot channel of the radio base station which currently supplies speech communication service, upon the time-out of the hand off drop timer, makes it impossible for the mobile telephone terminal to communicate with the radio base station which has supplied speech communication service up to now. As a result, the pilot field strength level report sent from the mobile telephone terminal does not reach the radio base station which currently supplies speech communication service, or alternatively, the soft hand off instruction signal from the radio base station, which currently supplies speech communication service, does not reach the mobile telephone terminal 7. Therefore, the soft hand off control cannot be carried out, unfavorably leading to call disconnection.

The occurrence of this problem is not limited to the inside of the tunnel. For example, when a mobile telephone terminal currently in speech communication through a radio base station installed on a hill descends from a considerably steep slope, the pilot receive field strength of the radio base station, which currently supplies speech communication service, is abruptly lowered and, in addition, the pilot receive field strength of the pilot channel of a radio base station installed on the bottom of the slope suddenly exceeds the threshold for the addition of a speech channel. In this case, as with the phenomenon caused within the tunnel, upon the time-out of the hand off drop timer, the mobile telephone terminal becomes uncommunicable with the radio base station which has supplied speech communication service up to now.

SUMMARY OF THE INVENTION

Accordingly, it is an object of this invention to provide a mobile telephone communication system which, even when an abrupt variation in the pilot receive field strength of a radio base station in its pilot channel, which currently supplies speech communication service to a mobile telephone terminal during movement, has made it possible for a pilot field strength level report sent from the mobile telephone terminal to reach the radio base station, which currently supplies speech communication service, or a soft hand off instruction signal from the radio base station, which currently supplies speech communication service, to reach the mobile telephone terminal, enables soft hand off control without causing cut off of signal transmission between the mobile telephone terminal and the radio base station.

According to the invention, a system for switching a speech channel between loosely coupled radio base stations, comprises:

a radio base station control unit which allows a mobile telephone terminal to have a communication channel through a plurality of radio base station devices; and a radio base station which is provided with a field strength measurement-only channel which allows the mobile telephone terminal to measure the field strength of radiowave to reach the mobile telephone terminal;

wherein the mobile telephone terminal measures the field strength in field strength measurement-only channel designated by the radio base station control unit and informs the radio base station control unit of the measurement results through the radio base station, and the radio base station unit is provided with a hand off table for recording a soft hand off candidate station for the each radio base station, and an additional station search table for recording an additional radio base station that the candidate station is expected to next perform soft hand off, and, regardless of the field strength, allows the mobile telephone terminal to have a speech channel to the additional station.

BRIEF DESCRIPTION OF THE DRAWINGS

FIG. 2 is a table showing an example of the contents of the conventional memory for soft hand off control.

DESCRIPTION OF THE PREFERRED EMBODIMENTS

The preferred embodiment of the invention will be described with reference to the accompanying drawings.

Figure 3:
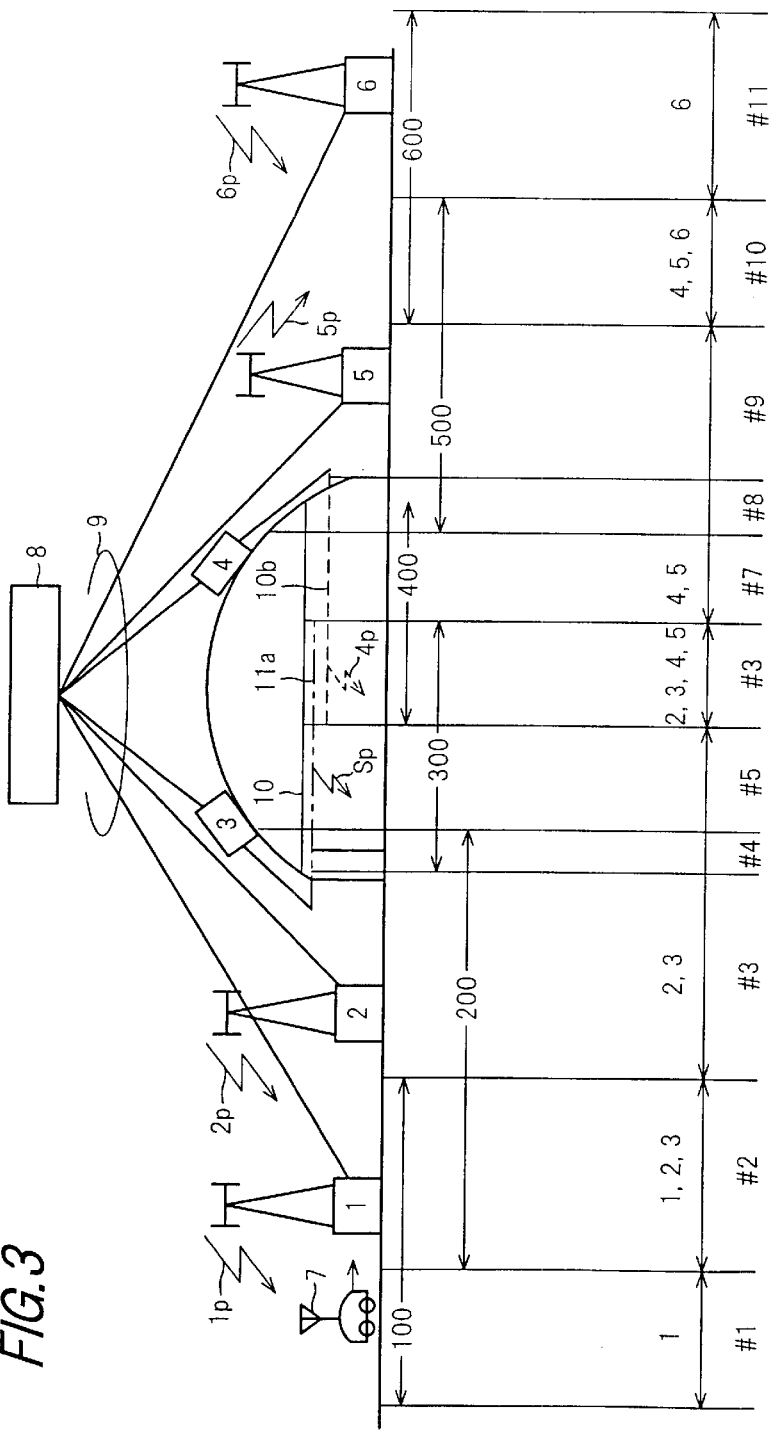
FIG. 3 is an illustration showing the operation of a speech channel switching system in a preferred embodiment according to the invention.

FIG. 3 is an illustration showing the speech channel switching system in the preferred embodiment according to the invention. FIG. 3 illustrates the transition of the state of speech channels used in a period wherein a mobile telephone terminal 7 moves from a service area 100 through a tunnel, which causes an abrupt variation in pilot receive field strength, and reaches a service area 600. In FIG. 3, in service areas 300 and 400 within a tunnel 10, an antenna line 11a and an antenna line 11b are set up so as to be overlapped with each other by a distance large enough to perform soft hand off control even when the mobile telephone terminal 7 is moved at a high speed, thereby constructing a service area. In this case, mobile telephone communication is carried out by a mobile telephone communication system which comprises: a mobile telephone terminal 7 movable over a plurality of service areas 100 to 600; radio base stations 1 to 6 installed respectively on the plurality of service areas; a radio base station control unit 8 which unifies a plurality of radio base stations through an assembled line 9 including control signal lines and voice signal lines and, with the movement of the mobile telephone terminal 7, controls soft hand off from a radio base station currently in communication service to another radio base station; and a memory for soft hand off control provided for extended soft hand off purposes in the radio base station control unit 8.

Figure 4:
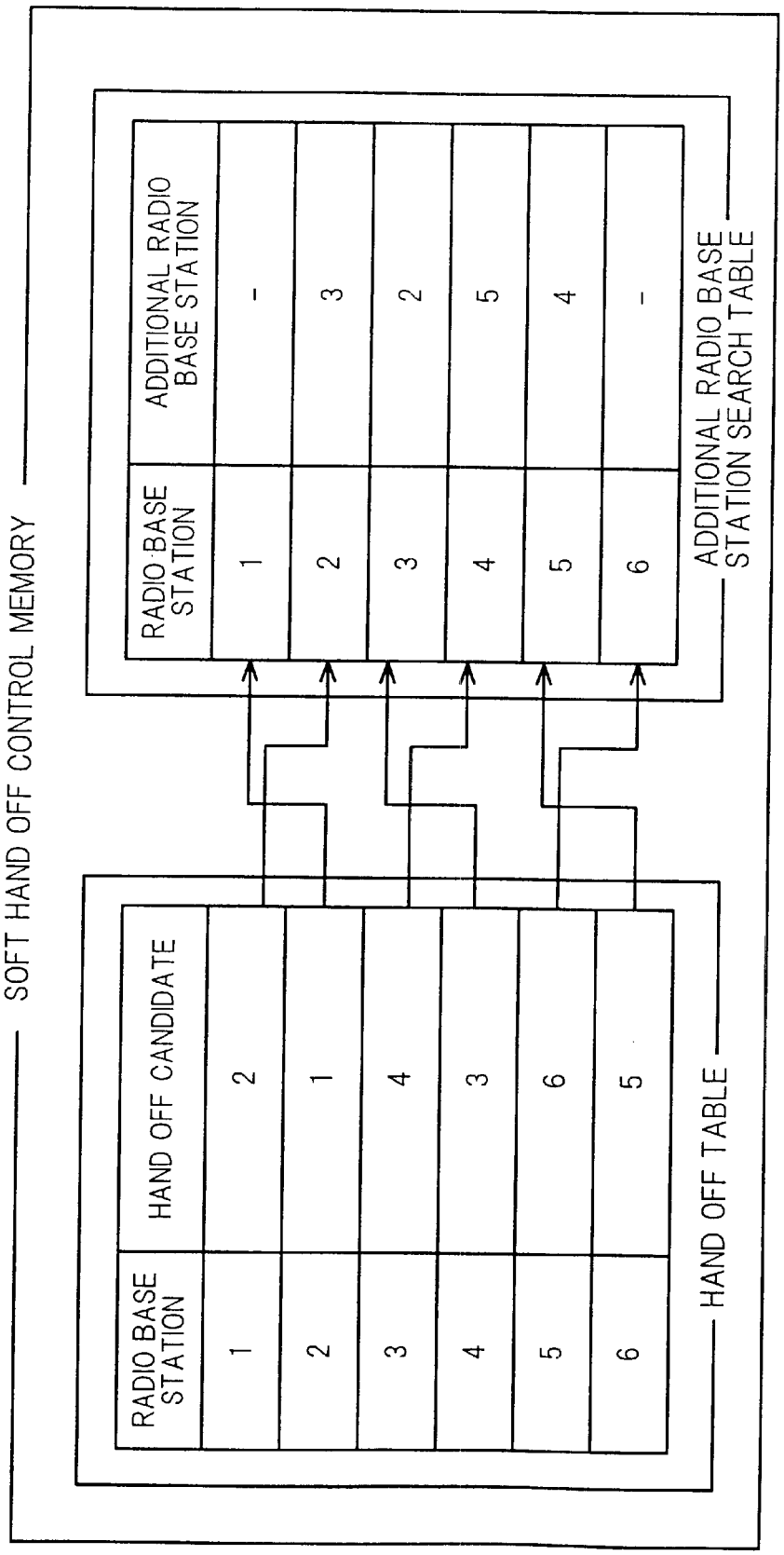
FIG. 4 is a table showing an example of contents of memory for soft hand off control used in the speech channel switching system in the embodiment according to the invention.

FIG. 4 is a table showing a memory for soft hand off control for specifying a radio base station as a soft hand off destination and an additional radio base station which are necessary in practicing extended soft hand off. A hand off table within a new memory for soft hand off control stores, as candidate radio base stations for hand off, neighbor radio base stations of each radio base station. An additional radio base station search table stores, as an additional radio base station, a radio base station which, together with the radio base station as the soft hand off destination specified by the hand off table, is subjected to soft hand off.

Regarding means for specifying a radio base station as a soft hand off destination by using the hand off table, the radio base station control unit receives, through radio base stations, a pilot field strength level report sent from the mobile telephone terminal, selects a radio base station having the highest pilot receive field strength among the radio base stations contained in the pilot field strength level report received by the radio base station control unit, selects a soft hand off candidate radio base station stored in the hand off table for the base station having the highest field strength, searches whether or not the candidate radio base station for soft hand off has a pilot receive field strength above the threshold for the addition of a speech channel, and, if the candidate radio base station exceeds the threshold for the addition of a speech channel, designates the radio base station as a radio base station as a soft hand off designation.

According to the present invention, in addition to the addition of a speech channel of the radio base station as the soft hand off destination, means is used which can prevent call disconnection even when the mobile telephone terminal enters a service area where the pilot receive field strength abruptly varies making it impossible for a pilot field strength level report sent from the mobile telephone terminal to reach the radio base station which currently supplies speech communication service, or otherwise for a soft hand off instruction signal from the radio base station, which currently supplies communication service, to reach the mobile telephone terminal. More specifically, an additional radio base station for the base station as the soft hand off destination is catalogued, and a reserved speech channel of the additional radio base station is also previously added to carry out extended soft hand off, thereby permitting a signal transmission/receiving between the mobile telephone terminal and the radio base station even when the pilot receive field strength has abruptly been varied.

The presence or absence of the additional radio base station may be determined as follows. An additional radio base station search table is provided, and, when there is a radio base station for the radio base station as the soft hand off destination stored in the additional radio base station search table, the stored radio base station is designated as the additional radio base station.

Figure 1:
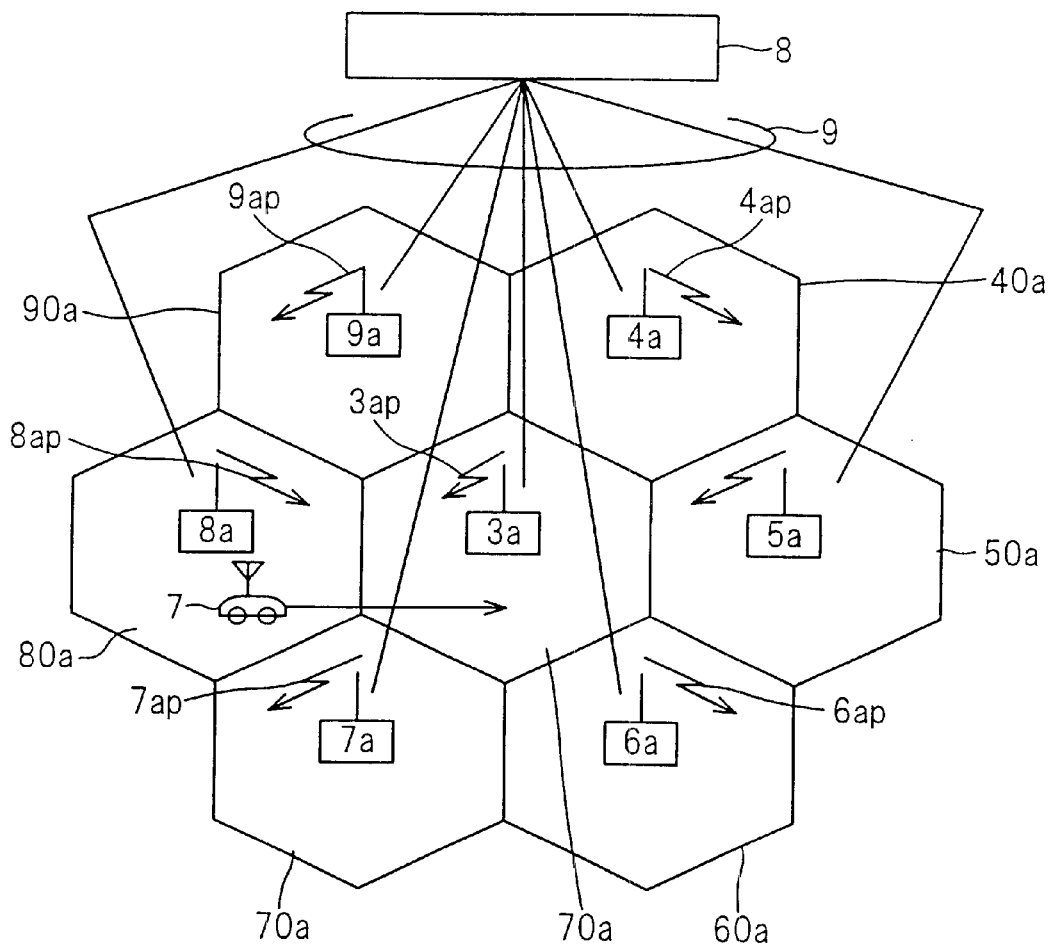
FIG. 1 is an illustration showing the conventional mobile communication system by CDMA.

The operation of the speech channel switching system according to the invention will be explained with reference to FIGS. 1 and 2.

When a mobile telephone terminal 7 is being moved in a portion #1, there is no overlapped service area and only a service area 100 exists. In this case, the mobile telephone terminal 7 receives speech communication service through a speech channel of a radio base station 1.

When the mobile telephone terminal 7 is moved to a portion #2, the service area 100 overlaps with a service area 200. At that time, the pilot receive field strength of a pilot channel 2p exceeds the threshold for the addition of a speech channel. The mobile telephone terminal 7 sends a pilot field strength level report to a radio base station control unit 8 through the radio base station 1. Upon the receipt of the pilot field strength level report, the radio base station control unit 8 judges that the radio base station 1 is a radio base station having the highest pilot receive field strength and that a radio base station 2 has a pilot receive field strength above the threshold for the addition of a speech channel. The radio base station control unit 8 can search the hand off table for that the radio base station 2 is a soft hand off candidate radio base station for the radio base station 1 and can search an additional radio base station search memory for that a radio base station 3 is an additional radio base station for the soft hand off candidate radio base station 2. The radio base station control unit 8 specifies, as the soft hand off destination radio base station, the soft hand off candidate radio base station 2 having a pilot receive field strength above the threshold for the addition of a speech channel, and, as the additional radio base station, the radio base station 3. The radio base station control unit 8 adds the speech channel of the soft hand off destination radio base station 2 and the reserved speech channel of the additional radio base station 3, and sends a hand off instruction signal to the mobile telephone terminal 7, followed by extended soft hand off control for the speech channel of the radio base station 1, which currently supplies communication service, the speech channel of the soft hand off destination radio base station 2, and the reserved speech channel of the additional radio base station 3.

When the mobile telephone terminal 7 is moved to a portion #3, the pilot receive field strength of the pilot channel 1p becomes a value below the threshold for the deletion of a speech channel. The mobile telephone terminal 7 sends a pilot field strength level report to the radio base station control unit 8 through the radio base station 2. Upon the receipt of the pilot field strength level report, the radio base station control unit 8 searches the additional radio base station search table for whether or not there is an additional radio base station for the radio base station 1 of which the pilot receive field strength has become weak and lowered to a level such that the speech channel should be deleted. The search results show that no additional radio base station for the radio base station 1 is stored in the table for the radio base station 1, that is, there is no additional radio base station for the radio base station 1. The radio base station control unit 8 designates the speech channel of the radio base station 1 as a speech channel to be deleted, notifies, through a hand off signal transmission, the mobile telephone terminal 7 of a decision that the speech channel of the radio base station 1 is to be deleted. The radio base station control unit 8 then deletes the speech channel of the radio base station 1, and performs extended soft hand off control for the speech channel of the radio base station 2, which currently supplies speech communication service, and the reserved speech channel of the additional radio base station 3.

When the mobile telephone terminal 7 is moved to a portion #4, the pilot receive field strength of a pilot channel 3p of the additional radio base station 3, which has been in the status of the reserved speech communication channel up to now, is abruptly increased, while the pilot receive field strength of the pilot channel 2p of the radio base station 2, which currently supplies speech communication service, is abruptly lowered. Since, however, this point is in an area where the service area 200 overlaps with the service area 300, both the pilot receive field strength of the pilot channel 2p of the radio base station 2, which currently supplies speech communication service, and the pilot receive field strength of the pilot channel 3p of the additional radio base station 3 are not below the threshold for the deletion of a speech channel. In this case, a signal transmission/receiving operation becomes possible also between the mobile telephone terminal 7 and the radio base station 3 through the speech channel of the additional radio base station 3 which has been in the state of the reserved speech channel. In addition, the addition and deletion of the speech channel are not carried out. Therefore, the state of soft hand off is continued for the speech channel of the radio base station 2, which continuously supplies communication service, and the speech channel of the additional radio base station 3 which has newly become possible to supply communication service.

When the mobile telephone terminal 7 is moved to a portion #5, the pilot receive field strength of the pilot channel 2p becomes a value below the threshold for the deletion of a speech channel. The mobile telephone terminal 7 sends a pilot field strength level report to the radio base station control unit 8 through the additional radio base station 3. Upon the receipt of the pilot field strength level report, the radio base station control unit 8 searches the additional radio base station search table for whether or not there is an additional radio base station for the radio base station 2 as a candidate base station to be deleted. The search results show that the radio base station 3 is catalogued as an additional radio base station for the radio base station 2. In this case, the radio base station control unit 8 does not delete the speech channel of the radio base station 2, which could have supplied speech communication service up to now, and holds the speech channel of the radio base station 2 as a reserved speech channel until the pilot receive field strength of the pilot channel 3p is lowered to a value below the threshold for the deletion of a speech channel, leading to extended soft hand off for the reserved speech channel of the radio base station 2 and the speech channel of the additional radio base station 3.

When the mobile telephone terminal 7 is moved to a portion #6, the pilot receive field strength of a pilot channel 4p exceeds the threshold for the addition of a speech channel. The mobile telephone terminal 7 sends a pilot field strength level report to a radio base station control unit 8 through the additional radio base station 3. Upon the receipt of the pilot field strength level report, the radio base station control unit 8 judges that the additional radio base station 3 is a radio base station having the highest pilot receive field strength and that a radio base station 4 has a pilot receive field strength above the threshold for the addition of a speech channel. The radio base station control unit 8 can search the hand off table for that the radio base station 4 is a soft hand off candidate radio base station for the additional radio base station 3 and can search the additional radio base station search memory for that a radio base station 5 is an additional radio base station for the soft hand off candidate radio base station 4. The radio base station control unit 8 specifies, as the soft hand off destination radio base station, the soft hand off candidate radio base station 4 having a pilot receive field strength above the threshold for the addition of a speech channel, and, as the additional radio base station, the radio base station 5. The radio base station control unit 8 adds the speech channel of the soft hand off destination radio base station 4 and the reserved speech channel of the additional radio base station 5, and sends a hand off instruction signal to the mobile telephone terminal 7, followed by extended soft hand off control for the reserved speech channel of the radio base station 2, the speech channel of the additional radio base station 3, the speech channel of the soft hand off destination radio base station 4 and the reserved speech channel of the additional radio base station 5.

When the mobile telephone terminal 7 is moved to a portion #7, the pilot receive field strength of the pilot channel 3p is abruptly lowered to a value below the threshold for the deletion of a speech channel. The mobile telephone terminal 7 sends a pilot field strength level report to the radio base station control unit 8 through the radio base station 4. Upon the receipt of the pilot field strength level report, the radio base station control unit 8 judges that the radio base station 4 is a radio base station having the highest pilot receive field strength and that the radio base station 3 has a pilot receive field strength below the threshold for the deletion of a speech channel. The radio base station control unit 8 can search the additional radio base station search table for that the radio base station 2 is the additional radio base station for the radio base station 3 of which the speech channel is to be deleted. Since the speech channel of the radio base station 2 has been held as the reserved speech channel, the pilot receive field strength of the radio base station 2 is already below the threshold for the deletion of a speech channel and hence is a speech channel to be deleted. Thus, all the additional radio base stations for the radio base station 3 are the base station to be deleted. Therefore, the radio base station 3 may be a base station to be deleted. The radio base station control unit 8 sends an hand off instruction signal to the mobile telephone terminal 7 through the radio base station 4, deletes the reserved speech channel of the radio base station 2 and the reserved speech channel of the radio base station 3, and performs extended soft hand off control for the speech channel of the radio base station 4, which currently supplies speech communication service, and the reserved speech channel of the additional radio base station 5.

When the mobile telephone terminal 7 is moved to a portion #8, the pilot receive field strength of a pilot channel 5p abruptly exceeds the threshold for the addition of a speech channel. In this case, a signal transmission/receiving operation is possible also between the mobile telephone terminal 7 and the radio base station 5 through the speech channel of the radio base station 5 which has been in the state of a reserved speech channel, and the state of soft hand off takes place for the speech channel of the radio base station 4, which currently supplies speech communication service, and the speech channel of the additional radio base station 5.

When the mobile telephone terminal 7 is moved to a portion #9, the pilot receive field strength of the pilot channel 4p is abruptly lowered to a value below the threshold for the deletion of a speech channel. The mobile telephone terminal 7 sends a pilot field strength level report to the radio base station control unit 8 through the radio base station 5. Upon the receipt of the pilot field strength level report, the radio base station control unit 8 judges that the radio base station 5 has the highest pilot receive field strength and that the radio base station 4 has a pilot receive field strength below the threshold for the deletion of a speech channel. The radio base station control unit 8 searches the additional radio base station search table for that the radio base station 5 is an additional radio base station for the radio base station 4 as a candidate station to be deleted. Since, however, the pilot receive field strength of the pilot channel 5p is not below the threshold for the deletion of a speech channel, the speech channel of the radio base station 4 as the candidate station to be deleted is not deleted and is held as a reserved speech channel. There is no change in the state of speech channels during soft had off except that a signal transmission/receiving is not possible between the mobile telephone terminal 7 and the radio base station 3 through the speech channel of the radio base station 4 which has become a preserved speech channel. In this case, the state of extended soft hand off is continued for the reserved speech channel of the radio base station 4 and the speech channel of the additional radio base station 5.

When the mobile telephone terminal 7 is moved to a portion #10, the pilot receive field strength of a pilot channel 6p exceeds the threshold for the addition of a speech channel. The mobile telephone terminal 7 sends a pilot field strength level report to the base station control unit 8 through the radio base station 5. Upon the receipt of the pilot receive field strength level report, the radio base station control unit 8 judges that the radio base station 5 has the highest pilot receive field strength and that a radio base station 6 has a pilot receive field strength above the threshold for the addition of a speech channel. The radio base station control unit 8 can search the hand off table in the soft hand off candidate holding memory for that the radio base station 6 is a soft hand off candidate radio base station for the radio base station 5. Further, the radio base station control unit 8 can search the additional radio base station search memory for that there is no additional radio base station for the radio base station 6. This, the radio base station control unit 8 specifies, as a soft hand off destination radio base station, the radio base station 6 having a pilot receive field strength above the threshold for the addition of a speech channel, and specifies that there is no additional radio base station. The radio base station control unit 8 adds the speech channel of the soft hand off destination radio base station 6, sends a hand off instruction signal to the mobile telephone terminal 7 through the radio base station 5, and performs extended soft hand off control for the reserved speech channel of the addition radio base station 4, the speech channel of the radio base station 5 and the speech channel of the soft hand off destination radio base station 6.

When the mobile telephone terminal 7 is moved to a portion #11, the pilot receive field strength of the pilot channel 5p is lowered to a value below the threshold for the deletion of a speech channel. The mobile telephone terminal 7 sends a pilot field strength level report to the radio base station control unit 8 through the radio base station 6. Upon the receipt of the pilot field strength level report, the radio base station control unit 8 judges that the radio base station 6 has the highest pilot receive field strength and that the radio base station 5 has a pilot receive field strength below the threshold for the deletion of a speech channel. The radio base station control unit 8 can search the additional radio base station search table for that the radio base station 4 is an additional base station for the radio base station 5 as a candidate station to be deleted. The speech channel of the additional radio base station 4 has been held as the reserved speech channel, and the pilot receive field strength of the pilot channel 4p is already lowered to a value below the threshold for the deletion of a speech channel and thus is a candidate channel to be deleted. Since all the additional radio base stations for the radio base station 5 as the candidate station to be deleted have become stations to be deleted, the speech channel of the radio base station 5 may also be a channel to be deleted. The radio base station control unit 8 sends a hand off instruction signal to the mobile telephone terminal 7 through the radio base station 6, and deletes the reserved speech channel of the additional radio base station 4 and the speech channel of the radio base station 5. Therefore, any reserved speech channel no longer exists, and only the speech channel of the radio base station 6 supplies speech communication service to the mobile telephone terminal 7.

ADVANTAGES OF THE INVENTION

As is apparent from the foregoing description, the invention can ensure an signal and data transmission/receiving operation between a mobile telephone terminal and a radio base station, and can prevent call disconnection and voice interruption to improve the speech communication quality.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A system for switching a speech channel between loosely coupled radio base stations, comprising:

a radio base station control unit which allows a mobile telephone terminal to have a communication channel through a plurality of radio base station devices; and a radio base station which is provided with a field strength measurement-only channel which allows said mobile telephone terminal to measure the field strength of radiowave to reach said mobile telephone terminal;

wherein said mobile telephone terminal measures the field strength in field strength measurement-only channel designated by said radio base station control unit and informs said radio base station control unit of the measurement results through said radio base station, and said radio base station control unit is provided with a hand off table for recording a soft hand off candidate station for said each radio base station, and an additional station search table for recording an additional radio base station that said candidate station is expected to next perform soft hand off, and regardless of the field strength, allows said mobile telephone terminal to have a speech channel to said additional station.

2. A speech channel switching system, according to claim 1, wherein:

said mobile telephone terminal requires for said radio base station to perform call connection; and said radio base station control unit, based on said request for call connection from said radio base station, establishes a speech channel for said mobile telephone terminal, specifies said candidate station and said additional station, and sends neighbor list signal to said mobile telephone terminal to inform said mobile telephone terminal of a field strength measurement list as a list of field strength measurement-only channels subject to the measurement of field strength.

3. A speech channel switching system, according to claim 1, wherein:

said radio base station control unit specifies said candidate station and said additional station, and sends a neighbor list signal to said mobile telephone terminal on conversation to inform said mobile telephone terminal of a field strength measurement list as a list of field strength measurement-only channels subject to the measurement of field strength.

4. A speech channel switching system, according to claim 3, wherein:

said mobile telephone terminal informs said radio base station control unit of a field strength at the field strength measurement-only channel for said radio base station or said additional station through said radio base station or said additional station; and said radio base station control unit, regardless of the field strength, allows said mobile telephone terminal to have the speech channel to said radio base station or said additional station, and, regardless of the field strength, accommodates said radio base station or said additional station in said field strength measurement list to make said mobile telephone terminal measure the field strength.

* * * * *